United States Patent
Krco et al.

(10) Patent No.: US 9,531,836 B2
(45) Date of Patent: Dec. 27, 2016

(54) DISTRIBUTING AN APPLICATION VIA A NETWORK NODE

(75) Inventors: Srdjan Krco, Novi Sad (RS); Mattias Eld, Spånga (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 1086 days.

(21) Appl. No.: 13/140,243

(22) PCT Filed: Dec. 18, 2008

(86) PCT No.: PCT/EP2008/067938
§ 371 (c)(1),
(2), (4) Date: Oct. 20, 2011

(87) PCT Pub. No.: WO2010/069387
PCT Pub. Date: Jun. 24, 2010

(65) Prior Publication Data
US 2012/0040657 A1  Feb. 16, 2012

(51) Int. Cl.
*H04W 4/00* (2009.01)
*H04L 29/08* (2006.01)
*G06F 9/445* (2006.01)

(52) U.S. Cl.
CPC ........ *H04L 67/34* (2013.01); *G06F 8/60* (2013.01)

(58) Field of Classification Search
CPC ........ H04W 8/245; H04W 8/265; H04W 4/00; H04W 4/003; H04W 4/02; H04W 4/06; H04W 4/12; H04M 1/72525; H04M 1/72522; H04M 1/2473; H04L 67/34; H04L 29/06312; H04L 67/10; G06F 8/60; G06F 15/16; G06F 9/445; G06F 9/46

(Continued)

(56) References Cited

U.S. PATENT DOCUMENTS 6,532,488 B1 * 3/2003 Ciarlante et al. ............. 709/205
6,625,141 B1   9/2003 Glitho et al.
(Continued)

FOREIGN PATENT DOCUMENTS

CN  1357190 A   7/2002
WO  98/56149 A1  12/1998
(Continued)

OTHER PUBLICATIONS

PCT International Search Report, mailed Nov. 25, 2009, in connection with International Application No. PCT/EP2008/067938.
(Continued)

*Primary Examiner* — Meless Zewdu
(74) *Attorney, Agent, or Firm* — Leffler Intellectual Property Law, PLLC

(57) ABSTRACT

A network node comprising an input, a processor and an output, the processor being coupled to the input and the output; the input and output both being connected to at least one network; in which the processor is arranged so as to receive from the input an executable application and an associated set of requirements for the application, in which the processor is arranged to determine, on receipt of an application and the associated set of requirements, a set of destination network nodes which are reachable through at least one network, to which the output is connected based upon the requirements and to send the application to the destination nodes through the output. Thus, an application can be distributed through a telecommunications network specifying only the requirements that a destination network must satisfy, rather than the addresses of the destination network nodes. Furthermore, the application can be transferred between network nodes should user equipment move through the network.

20 Claims, 2 Drawing Sheets

(58) Field of Classification Search
USPC ....... 455/404.2, 418–420, 445, 456.1–456.6, 455/466, 500, 517, 524, 560–561; 709/201, 230–232, 235, 237–238; 370/237–238, 310, 328, 338, 351, 395.3, 370/395.32, 409
See application file for complete search history.

(56) References Cited

U.S. PATENT DOCUMENTS

| | | | |
|---|---|---|---|
| 6,957,256 B1* | 10/2005 | Bradley et al. | 709/223 |
| 7,099,663 B2* | 8/2006 | Lundblade et al. | 455/425 |
| 7,283,539 B2* | 10/2007 | Wang et al. | 370/401 |
| 7,434,217 B2* | 10/2008 | Morris | 717/177 |
| 7,826,829 B2* | 11/2010 | Pousti | 455/414.1 |
| 8,234,193 B2* | 7/2012 | Ransom et al. | 705/35 |
| 8,312,423 B1* | 11/2012 | Webb et al. | 717/106 |
| 2002/0199117 A1* | 12/2002 | Nagaya | 713/201 |
| 2004/0156495 A1* | 8/2004 | Chava et al. | 379/392 |
| 2004/0177359 A1* | 9/2004 | Bauch et al. | 719/313 |
| 2005/0166041 A1* | 7/2005 | Brown | 713/150 |
| 2006/0079255 A1* | 4/2006 | Bantukul et al. | 455/466 |
| 2007/0264985 A1* | 11/2007 | Kapur et al. | 455/414.1 |
| 2007/0300160 A1* | 12/2007 | Ferrel et al. | 715/744 |
| 2008/0194228 A1* | 8/2008 | Pousti et al. | 455/406 |
| 2008/0319851 A1* | 12/2008 | Grigorovitch et al. | 705/14 |
| 2009/0328028 A1* | 12/2009 | O'Rourke et al. | 717/173 |

FOREIGN PATENT DOCUMENTS

| | | |
|---|---|---|
| WO | 02/087094 A1 | 10/2002 |
| WO | 03/083688 A1 | 10/2003 |

OTHER PUBLICATIONS

Chinese Office Action, dated Jun. 5, 2013, in connection with counterpart Chinese Patent Application No. 200880132461.7, all pages (see translation below).

Translation of Chinese Office Action, dated Jun. 5, 2013, in connection with counterpart Chinese Patent Application No. 200880132461.7, all pages.

Chinese Search Report, dated May 28, 2013, in connection with counterpart Chinese Patent Application No. 200880132461.7, all pages.

* cited by examiner

DISTRIBUTING AN APPLICATION VIA A NETWORK NODE

TECHNICAL FIELD

This invention relates to a network node, a telecommunications network and a method for distributing an application, typically through a telecommunications network such as, non-exclusively, a public land mobile network.

BACKGROUND

In modern mobile networks such as public land mobile networks, information generated by mobile subscribers is transported over a radio access network to a core network and finally onwards to the end destination where it is processed. In many sensor and M2M (machine-to-machine) based applications it is desirable to reduce the amount of data that has to be transmitted over what can be a lengthy transmission path, thereby to provide a faster feedback loop, where feedback is employed.

In current public land mobile networks, third party application servers (that is, those not provided by the operator of the network) are always implemented as sitting outside of the operator's network and the information transmitted from the mobile subscribers to the application servers must be relayed through both the radio access and core networks.

As such, redundant information may be transmitted through the network, which impacts the overall network capacity. This is particularly important for sensor/M2M based applications in which a number of sensors/machines in an area are observing the same phenomenon and are reporting back to the server via mobile devices thus generating redundant load on the network.

SUMMARY

According to a first aspect of the invention, there is provided a network node comprising an input, a processor and an output, the processor being coupled to the input and the output; the input and output both being connected to at least one network; in which the processor is arranged so as to receive from the input an executable application and an associated set of requirements for the application, in which the processor is arranged to determine, on receipt of an application and the associated set of requirements, a set of destination network nodes which are reachable through at least one network to which the output is connected based upon the requirements and to send the application to the destination nodes through the output.

Accordingly, the present invention provides a means for deploying an application within a network, such as a telecommunications network; typically, the network node is arranged to form a node of a telecommunications network. The application can be provided from outside the network and distributed to only those nodes that require its services or otherwise meet the set of requirements.

The set of requirements may comprise at least one of:
the location of the destination network node;
the sender of the application;
the nature of an equipment in which the destination network node is comprised; and
the date and/or time.

The set of requirements may comprise information relating to at least one further network node that is connected to the at least one network through the destination network node. For example, the destination network node may comprise a radio base station, such as a NodeB or E-NodeB, whereas the or each further network node may comprise a mobile user equipment, such as a mobile telephone or wireless data modem.

The network node may be a node of a core network of the telecommunications network. Alternatively, the network node may be a node of a radio access network forming part of the telecommunications network.

The set of requirements may relate to the radio base station to which the destination nodes are connected.

According to a second aspect of the invention, there is provided a telecommunications network, comprising a plurality of network nodes connected together for communication therebetween, in which one of the network nodes is a distribution network node according to the first aspect of the invention and the processor of the distribution network node is arranged to select as the set of destination nodes a selection of the network nodes.

Thus, the distribution network node can take an application and distribute it to multiple network nodes based upon the set of requirements, without multiple copies having to be sent from outside the network.

The network may comprise or be connected to a sender network node, arranged to send the application and the set of requirements to the distribution network node, typically through the telecommunications network. However, the sender network node may be outside the network.

The distribution network node may have access to data relevant to whether the network nodes meet the set of requirements to which the sender node does not have access. Thus, rather than having to provide access to data such as internal network addresses or even the number of relevant nodes to a third party provider providing the application, the provider can provide the application to the distribution node which can securely distribute the application throughout the network based upon the requirements.

The destination network nodes may typically comprise a radio base station, such as a NodeB or E-NodeB.

According to a third aspect of the invention, there is provided a method of distributing an application through a telecommunications network, comprising preparing at a sender network node an application and a set of requirements for that application, sending the application and the set of requirements to a distribution network node in the telecommunications network, determining at the distribution node a set of destination network nodes in the telecommunications network based upon the set of requirements and sending the application to the destination network nodes.

Thus, the distribution network node can take an application and distribute it to multiple network nodes based upon the set of requirements, without multiple copies having to be sent from outside the network.

The method may comprise providing the distribution network node with access to data relating to whether network nodes in the telecommunications network comply with the set of requirements to which the sender network node does not have access. Thus, the distribution network node can securely make a decision on the destination network nodes to which the application should be sent, without the sender network node, which may be a third party application server, necessarily having access to potentially confidential or sensitive data.

The set of requirements may comprise at least one of:
the location of the destination network node;
the sender of the application;
the nature of an equipment in which the destination network node is comprised;
the date and/or time.

The set of requirements may comprise information relating to at least one further network node that is connected to at least one of the or each network through the destination network node. For example, the destination network node may comprise a radio base station, such as a NodeB or E-NodeB, whereas the or each further network node may comprise a mobile user equipment, such as a mobile telephone or wireless data modem. Typically, the sender node is external to the telecommunications network.

The method preferably includes the step of executing the application in the or each destination network node. As such, the application will typically cause the destination network node to exchange messages with the further network nodes. Thus, the destination network node may be able to securely execute third party applications and collate date from the further network nodes. If a plurality of further network nodes are, for example, sensors all sensing the same, or related, physical phenomena, then the application may, for example, collate that data such that less data needs to be sent back outside of the network. Thus, the present invention can make more efficient use of the available bandwidth.

Particularly where the further network nodes are mobile user equipment, it is likely that such further network nodes could move around the telecommunications network and so change the radio base station to which they are associated. As such, the method may also comprise transferring the application to a different destination network node should there be a change in the network nodes associated with the destination network nodes. Thus, as a user moves their user equipment around the network, the advantages of the present invention may still be open to them.

DETAILED DESCRIPTION

The embodiments of the invention described below provide telecommunications networks in which the network is opened up for deployment of third party applications and, in particular, the computing resources in the radio base station (NodeB or eNodeB) can be employed. It is proposed to introduce secure areas on each network node in a mobile operator's network that can be used by the third party service providers to execute their own service specific code. The secure areas allow applications to hook into the ongoing processes controlled by the network node through the use of standardized API methods.

In addition to that, it is proposed to provide a network service that will allow third-party applications to specify one or more application files they want to upload and to define the additional parameters or requirements important for the execution of application logic for each such file. The parameters can be the area for which the application is valid, mobile subscribers that are of interest to the application, time of the day/year when it should be running, priority etc. Based on these parameters, the mobile network distributes the application to all relevant network nodes (for example to all Node Bs in Dublin area that have Coca Cola vending machines attached to them).

Also, in the second embodiment of the invention, it is proposed to introduce a network mechanism that will monitor movement of the application's objects of interest using standard network services (for example location and routing area information, handover information). Based on this information, the network will automatically transfer the application between the two or more network nodes in order to ensure that the application is available wherever the object of interest moves.

Figure 1:
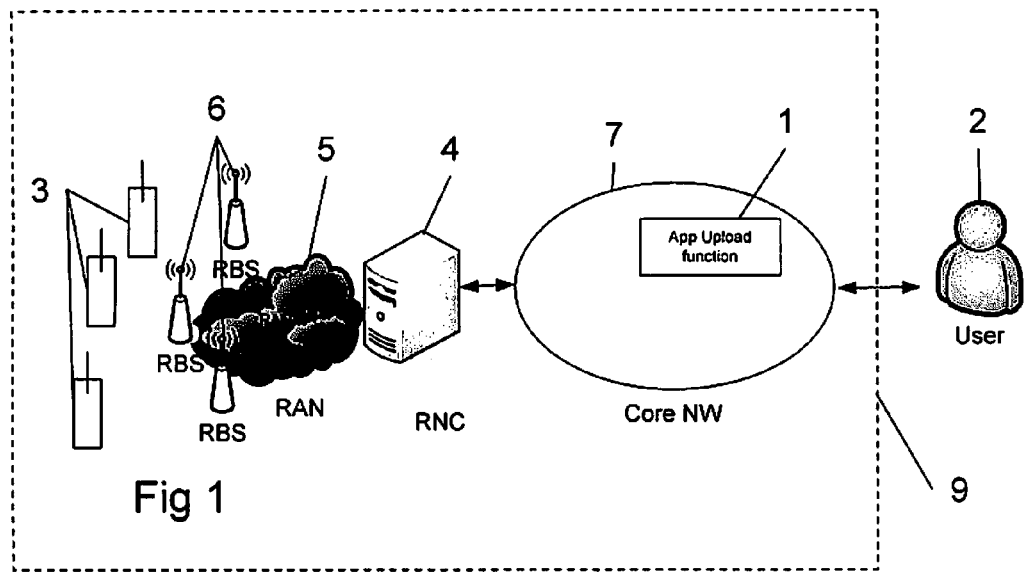
FIG. 1 shows a network according to a first embodiment of the invention.
Figure 2:
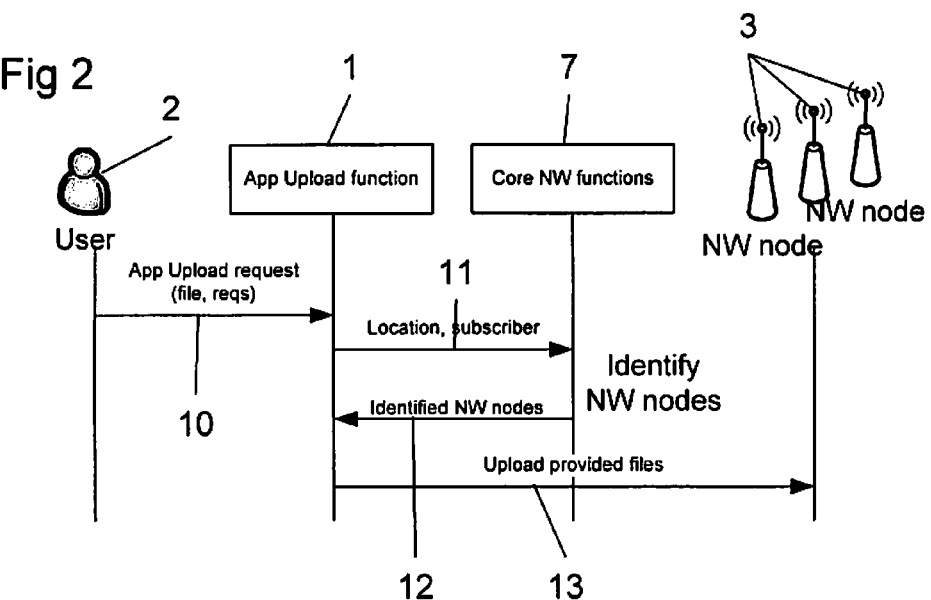
FIG. 2 shows a signalling flowchart showing the operation of the network of FIG. 1.
Figure 3:
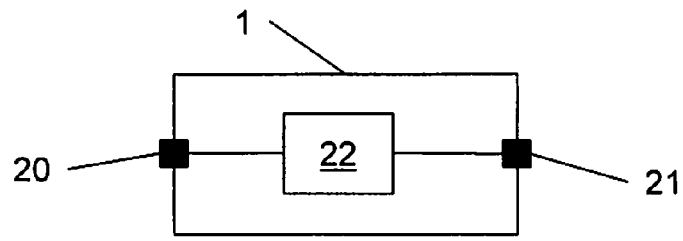
FIG. 3 shows schematically the distribution network node of FIG. 1.

In the first embodiment of the invention shown in FIGS. 1 to 3 of the accompanying drawings, a public land mobile telecommunications network (PLMN) 9 is provided. This comprises a core network 7, which connects a plurality of radio access networks 5 together (of which only one is shown). Access to each radio access network 5 is by means of a radio network controller (RNC) 4. Each RNC 4 controls a plurality of radio base stations (RBSs) 6; in the case of GSM or LTE networks, these RBSs could be nodeBs or EnodeBs respectively. A plurality of mobile user equipment 3 can connect to the radio access networks 5 through the radio base stations 6 as is common in such networks.

In the embodiment of FIG. 1, an external third party 2 wishes to deploy an application on a selection of the mobile user equipment 3. As such, he provides his application (step 10 in FIG. 2) to a distribution network node 1 within the core network 7, which runs an application upload function.

The distribution network node 1 is shown in more detail in FIG. 3 of the accompanying drawings. It comprises an input 20 and an output 21 linked by a processor 22. The functions it carries out are shown in more detail in FIG. 2 of the accompanying drawings.

In the aforementioned step 10, the third party sending the application from their server 2 specifies the application file to be uploaded, together with a set of requirements that the distribution network node 1 will use to identify an appropriate set of destination network nodes, being a subset of the mobile user equipment 3.

Possible requirements include the following:
Area in which the application should be active (specified by GPS coordinates, Dublin city centre, around Croke Park, etc.)
Mobile subscriber providing the information
Mobile subscriber about whom certain information has to be obtained
Mobile subscribers of certain type (vending machines, medical personnel, vehicles, etc.)
Time of the day/year when the application should be active.

The destination network node then, at step 11, polls the core network 7 functions to determine which destination network nodes are present and which meet the criteria. The data polled includes the subscriber's details, the location of the equipment and so on. As this data is sensitive, the third party 2 does not have access thereto. From this data, the destination network node determines a set of the mobile user equipment (at step 12) that meet the criteria. These become the destination network nodes.

Finally, the distribution network node 1 distributes, at step 13, the application to the destination network nodes 3. The destination network nodes can then execute the application.

Accordingly, instead of having to define internet protocol address or the like (which might represent confidential data to the network 9 operator) the third party 2 can instead simply identify the criteria to be employed in deploying the application and allow the distribution network note 1 to then transmit the application to the set of destination network nodes so chosen. The third party (and the network node from which the application is sent to the distribution node) need not and generally will not be able to access the data requirement to determine whether a given network node meets the requirements. This embodiment also involves data being sent over shorter links in total; the distribution network node is within the core network 7 and so is closer to the destination nodes 3 than the third party 2.

Figure 4:
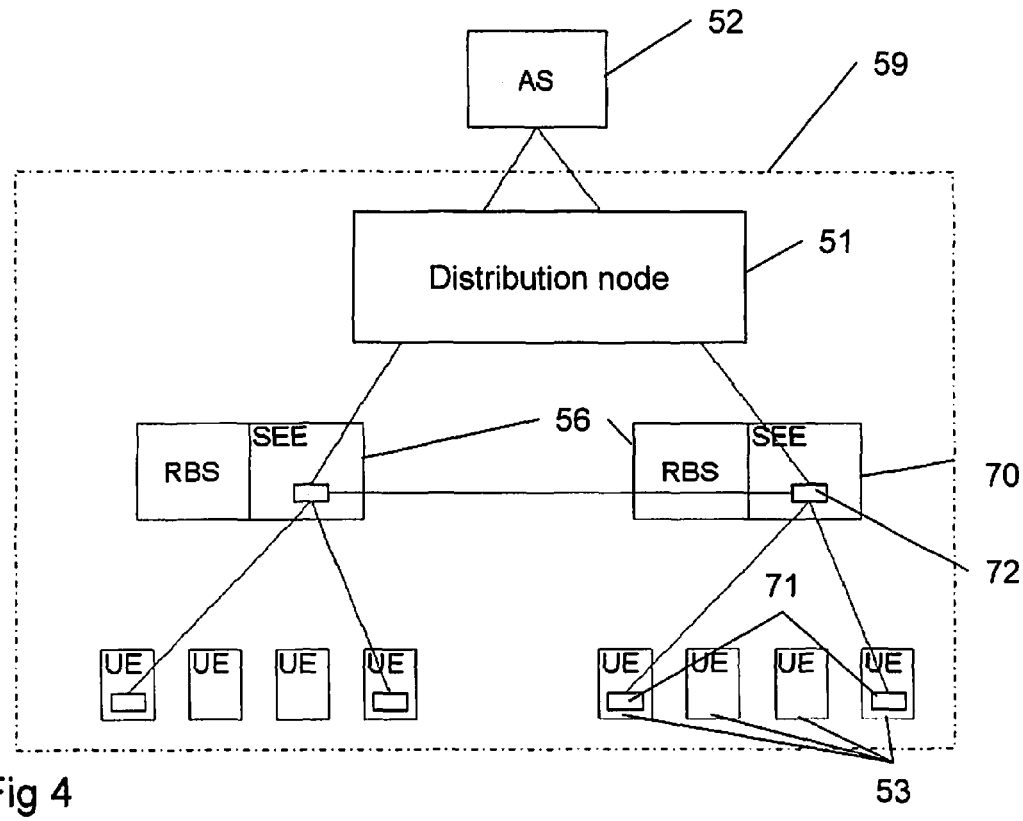
FIG. 4 shows a network according to a second embodiment of the invention.
Figure 5:
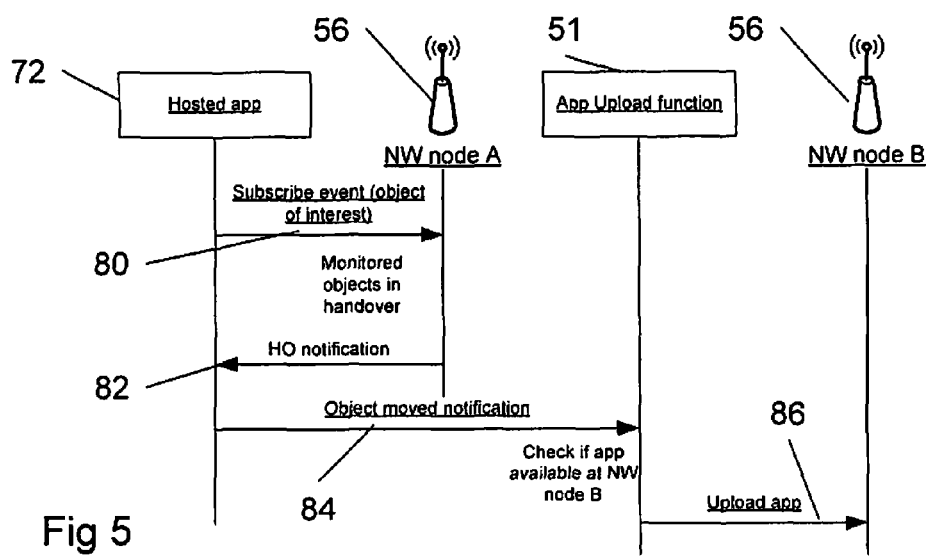
FIG. 5 shows a signalling flowchart showing the operation of the network of FIG. 4.

A second embodiment of the invention is shown in FIGS. 4 and 5 of the accompanying drawings. Integers corresponding to those of the first embodiment of the invention have been given like reference numerals, raised by 50.

In this embodiment, a third party application server 52 is shown outside of a telecommunications network 59. The third party application server 52 is connected to a distribution network node 51 in the telecommunications network as in the previous embodiment, the third party application server 52 providing the distribution network node 51 with an application to be distributed and a set of requirements that a destination node must meet in order to be provided with the application.

However, in this embodiment the set of destination nodes is not chosen from the mobile user equipment 53. Instead, the set of destination nodes is chosen from the radio base stations 56. The set of requirements includes data concerning the user equipment 53 that are associated with the radio base stations.

As such, the set of requirements can include any of the aforementioned criteria referred to above with respect to both the radio base stations 56 and the user equipment. For example, the distribution node may be arranged to select those radio base stations that have user equipment associated with them that have a specific subscription type, are a specific type of sensor or are a specific type of vending machine.

Once the set of destination nodes 56 has been made, the application is distributed by the destination network node 51 to the set of destination nodes 56. The application is then executed within a secure execution environment (SEE) 70 within the relevant radio base stations. This secure execution environment separates the third party application functions from the network functions of the radio base station 56. It can be seen as similar to a Java sandbox or, if security should be physically enforced, a Universal Integrated Circuit Card (UICC) as used with mobile phones.

The application 72 is permitted to exchange messages, through a pre-defined application programming interface (API), with the relevant user equipment 53 (shown as executing user equipment program 71, which may have been distributed according to the first embodiment of the invention). Other communication may be restricted, such that only communication with the relevant user equipment and nodes external to the network 59 is allowed. The relevant user equipment may be those that caused the selection of the radio base station 56 in the set of destination network nodes; that is, those that meet the user equipment (rather than radio base station) requirements.

Because the radio base station is much closer to the user equipment than any network nodes outside the telecommunications network 59, it can respond much quicker to messages from the relevant user equipment 53. At the same time, the application will be able to process and aggregate messages coming from all user equipment attached to the radio base station, thus potentially reducing the amount of data transferred through the network.

The use of network resources by a third party application can be governed by appropriate service level agreements (SLAs) agreed during the initial agreement between the third party service provider and the mobile network provider. The execution elements can be secure, so that the code being executed should not be accessible by the operators themselves.

The uploaded application will interact with the rest of the system using set of API methods provided by the operator and allowing the application access to only those data stream that the application is authorized to access. In order to achieve this, it is proposed to introduce an identifier for messages sent to and from the user equipment at the link layer to identify the receiving application. If no receiving application is defined, the message is treated as at present, i.e. it is forwarded through the network. If the receiving application is defined and such application does not exist on a particular network node that processes the message, it is forwarded to the next network node that does.

Third party applications may be permitted to communicate using the channels of the operator given proper SLAs, and also to have inter-RBS communication ordinarily used for example for mobility and network management.

The application may not only be distributed over the RBSs but can also be distributed to other nodes belonging to the operator such as the UICC of the user equipment (commonly referred to as the SIM card) and the serving gateway support node (SGSN). Of course, the application can always be distributed to other parts not belonging to the operator (the user equipment main execution part, the third party application provider's own servers, and other operators' networks.)

An application can also have the possibility to locally invoke services from the operator, such as requesting a call set up to a user equipment subscribing to its service or to issue local Multimedia Broadcast Multicast Service (MBMS) broadcasts.

It is also appreciated that the user equipment is mobile, and so may move from one radio base station to another. Thus, the present embodiment provides functionality whereby an application can be transferred to other appropriate network nodes on movement of a mobile user equipment to another radio base station. This is shown in FIG. 5 of the accompanying drawings.

Once the application deployed, it will monitor (step 80) the information obtained from the relevant user equipment or from the network 59 concerning the relevant user equipment that are associated with the radio base station 56. When the relevant user equipment enter into a handover procedure with another radio base station, or leave the coverage of the network node on which the application is running, the application is notified (step 82).

This method uses available network information regarding the handover procedure, i.e. to which node the relevant user equipment is being handed over to determine if the application should be transferred as well. The network identity of the new node is forwarded to the distribution network node (step 84), which keeps a list of network nodes on which the application has already been deployed. If the application is not available on the new radio base station, the distribution network node 51 initiates the application upload procedure to the new radio base station (step 86). If the application was already uploaded and active on the new network node, no action is undertaken.

If the relevant user equipment are switched off and are not available any more, the radio base station running the application informs the distribution network node about this event. This distribution network node then subscribes to home or visitor location register (HLR/VLR) information so as to be informed when the user equipment in question becomes available again. Once it is available, the application control entity initiates the application upload if the application is not available at the new radio base station already.

Accordingly, it can be seen that the several embodiments of the invention can have several advantages. It is possible to execute application specific logic closer to the actual event that is being monitored and hence significantly decrease the amount of data transferred across the network. The installed network infrastructure can be used to provide additional computing resources for location specific computing tasks thus extending its primary functionality.

Delay in reacting to specific events observed by mobile subscribers can be significantly reduced. Applications are distributed to all relevant network nodes without having to specify network addresses of each node; conversely, applications can be uploaded only to those network nodes that can provide relevant information.

Applications can be automatically transferred between the network nodes to ensure they are always available at required locations, meaning that smooth and uninterrupted execution of applications can be achieved.

The invention claimed is:

1. A network node comprising:
an input;
a processor; and
an output,
wherein:
the processor is coupled to the input and the output;
the input and output are both connected to at least one network;
the processor is arranged so as to receive from the input an executable application and an associated set of requirements for the application; and
the processor is arranged to determine, on receipt of the executable application and the associated set of requirements, a set of destination network nodes which are reachable through the at least one network to which the output is connected based upon the requirements and to send the executable application to the destination network nodes through the output.

2. The network node of claim 1, in which the set of requirements comprise at least one of:
a location of the destination network node;
a sender of the application;
a nature of an equipment in which the destination network node is comprised; and
a date and/or time.

3. The network node of claim 1, in which the set of requirements comprise information relating to at least one further network node that is connected to the at least one network through the destination network node.

4. The network node of claim 3, in which the network node is a node of a radio access network forming part of a telecommunications network, and in which the at least one further network node comprises mobile user equipment.

5. The network node of claim 1, in which the network node is arranged to form a node of a telecommunications network.

6. The network node of claim 5, in which the set of requirements relate to a radio base station to which the destination network nodes are connected.

7. The network node of claim 1, in which the node is a node of a core network of a telecommunications network.

8. The network node of claim 1, in which the network node is a node of a radio access network forming part of a telecommunications network.

9. A telecommunications network, comprising:
a plurality of network nodes connected together for communication therebetween,
wherein one of the network nodes is a distribution network node comprising:
an input;
a processor; and
an output,
wherein:
the processor is coupled to the input and the output;
the input and output are both connected to at least the telecommunications network;
the processor is arranged so as to receive from the input an executable application and an associated set of requirements for the application; and
the processor is arranged to determine, on receipt of the executable application and the associated set of requirements, a set of destination network nodes which are reachable through the at least the telecommunications network to which the output is connected based upon the requirements and to send the executable application to the set of destination network nodes through the output,
and wherein the processor of the distribution network node is arranged to select the set of destination network nodes from the plurality of network nodes.

10. The telecommunications network of claim 9, comprising a sender network node, arranged to send the application and the set of requirements to the distribution network node.

11. The telecommunications network of claim 10, in which the distribution network node has access to data relevant to whether the network nodes meet the set of requirements to which the sender node does not have access.

12. The telecommunications network of claim 9, in which the destination network nodes comprise a radio base station.

13. A method of distributing an application through a telecommunications network, the method comprising:
preparing at a sender network node an application and a set of requirements for that application;
sending the application and the set of requirements to a distribution network node in the telecommunications network;
determining at the distribution node a set of destination network nodes in the telecommunications network based upon the set of requirements; and
sending the application to the destination network nodes.

14. The method of claim 13, comprising providing the distribution network node with access to data relating to whether the destination network nodes in the telecommunications network comply with the set of requirements to which the sender network node does not have access.

15. The method of claim 14, in which the set of requirements comprise information relating to at least one further network node that is associated with a destination network node of the set of destination network nodes.

16. The method of claim 15, further comprising the step of executing the application in the set of destination network nodes, in which, as part of the execution of the application, the application causes the destination network node to exchange messages with the at least one further network node.

17. The method of claim 15, in which the method comprises transferring the application to a different destination network node should there be a change in the at least one further network node associated with the destination network node of the set of destination network nodes.

18. The method of claim 13, in which the set of requirements comprise at least one of:
   a location of the destination network node;
   a sender of the application;
   a nature of an equipment in which the destination network node is comprised; and
   a date and/or time.

19. The method of claim 13, further comprising the step of executing the application in the set of destination network nodes.

20. The method of claim 13, in which the distribution network node is a network node comprising:
   an input;
   a processor; and
   an output,
   wherein:
   the processor is coupled to the input and the output;
   the input and output are both connected to at least one network;
   the processor is arranged so as to receive from the input an executable application and an associated set of requirements for the application; and
   the processor is arranged to determine, on receipt of the executable application and the associated set of requirements, a set of destination network nodes which are reachable through the at least one network to which the output is connected based upon the requirements and to send the executable application to the destination network nodes through the output; and
   wherein the network node is a radio base station.

* * * * *

UNITED STATES PATENT AND TRADEMARK OFFICE
CERTIFICATE OF CORRECTION

PATENT NO.        : 9,531,836 B2
APPLICATION NO.   : 13/140243
DATED             : December 27, 2016
INVENTOR(S)       : Krco et al.

It is certified that error appears in the above-identified patent and that said Letters Patent is hereby corrected as shown below:

In the Specification

Column 3, Line 21, delete "date" and insert -- data --, therefor.

Column 4, Line 22, delete "telecommunications network" and insert -- network --, therefor.

Column 5, Line 8, delete "note" and insert -- node --, therefor.

Column 5, Line 47, delete "destination" and insert -- distribution --, therefor.

In the Claims

Column 8, Line 35, Claim 9, delete "and" and insert the same at Line 34, after "output," as a continuation point.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*